(12) United States Patent
Fosty et al.

(10) Patent No.: US 7,859,406 B2
(45) Date of Patent: Dec. 28, 2010

(54) ALARM SYSTEM AUDIO INTERFACE TAMPER AND STATE DETECTION

(75) Inventors: Stephen D. W. Fosty, Brampton (CA); Michael J. Vandenberg, Erin (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 309 days.

(21) Appl. No.: 12/053,854

(22) Filed: Mar. 24, 2008

(65) Prior Publication Data

US 2009/0135010 A1 May 28, 2009

(30) Foreign Application Priority Data

Nov. 22, 2007 (CA) .................................. 2611462

(51) Int. Cl.
*G08G 13/00* (2006.01)
(52) U.S. Cl. ..................... 340/541; 340/522; 340/533; 340/536; 379/44; 379/47; 455/425
(58) Field of Classification Search ......... 340/506–541, 340/568.2–568.4; 379/37–47; 381/58, 92; 455/404.1–425
See application file for complete search history.

(56) References Cited

U.S. PATENT DOCUMENTS

| | | | | |
|---|---|---|---|---|
| 3,697,984 A | * | 10/1972 | Atkinson et al. | 340/505 |
| 3,846,794 A | * | 11/1974 | Le Nay et al. | 340/534 |
| 4,060,803 A | * | 11/1977 | Ashworth, Jr. | 340/506 |
| 4,218,763 A | | 8/1980 | Kelley et al. | |
| 5,608,724 A | * | 3/1997 | Green, Jr. | 370/307 |
| 5,812,054 A | * | 9/1998 | Cohen | 340/506 |
| 6,081,193 A | * | 6/2000 | Trucchi et al. | 340/541 |
| 7,277,849 B2 | | 10/2007 | Streich et al. | |
| 7,443,289 B2 | * | 10/2008 | Smith | 340/506 |
| 2003/0096607 A1 | | 5/2003 | Taylor | |
| 2005/0276423 A1 | | 12/2005 | Aubauer et al. | |

FOREIGN PATENT DOCUMENTS

| EP | 0 683 492 B1 | 7/2000 |
|---|---|---|
| WO | WO 2007/030190 A1 | 3/2007 |
| WO | WO 2007/032971 A2 | 3/2007 |

\* cited by examiner

*Primary Examiner*—Brent Swarthout
(74) *Attorney, Agent, or Firm*—Smart & Biggar

(57) ABSTRACT

An alarm system comprises: an audio interface comprising: a microphone; a state sensor for sensing a state at the audio interface; a signal generator for generating an inaudible state signal indicative of the state; a multiplexer for combining an audio signal from the microphone and the state signal; a control panel for monitoring sensed conditions at the audio interface; a conductor interconnecting the audio interface to the control panel carrying audio signal and the state signal as combined from the audio interface to the control panel.

16 Claims, 4 Drawing Sheets

ALARM SYSTEM AUDIO INTERFACE TAMPER AND STATE DETECTION

FIELD OF THE INVENTION

The present invention relates generally to alarm systems, and more particularly to an alarm including an audio interface, and the detection of a state or tampering at the audio interface.

BACKGROUND OF THE INVENTION

Home and business alarms have become commonplace. Such alarms (often referred to as "security systems" or "alarm systems") typically include several sensors used to monitor unauthorized entry and other conditions at monitored premises, such as fire, smoke, toxic gases, high/low temperature (e.g. freezing) or flooding, at a premises. In response to sensing an alarm condition, a sensor provides a signal to an alarm panel that in turn may sound and notify the occurrence of the alarm to occupants of the premises and remotely signal a monitoring center or other third party.

Typically the occurrence of an alarm is signalled to a remote monitoring center that may then dispatch capable authorities to intervene at the premises. For example, in the case of sensing an unauthorized entry to the premises, the monitoring center may dispatch security personnel, typically in the form of private security guards or police officers.

Additionally, many alarm systems now allow audio communication with the monitoring center. Such audio communication may be one-way (e.g. from the premises to the station) or two-way (i.e. from and to the premises/monitoring center). In this way, the alarm system may be used to audibly monitor the premises during an alarm condition, or it may be used to dispatch a verbal request for help by an occupant at the monitored premises. To this end, some alarm systems are equipped with an audio interface, including a microphone and optionally a speaker.

Communication between the premises and the monitoring station typically takes place over a communications network, for example by way of the public switched telephone network (PSTN).

Unfortunately, audio interfaces are susceptible to unauthorized modification, or disconnection by intruders or others. Tampering can be deterred by encasing the audio interface. This however, is costly and cumbersome. Alternatively, tampering can be detected.

Accordingly there is a need for alarm systems and audio interfaces that allow tamper detection.

SUMMARY OF THE INVENTION

In accordance with an aspect of the present invention, there is provided an alarm system comprising; an audio interface comprising: a microphone; a state sensor for sensing a state at the audio interface; a signal generator for generating an analog state signal indicative of the state; a combiner for forming a combined signal from an electrical signal corresponding to audio sensed at the microphone, and the state signal so that the state signal does not interfere with reproduction of audio from the electrical signal; a control panel for monitoring sensed conditions at the audio interface; a conductor interconnecting the audio interface to the control panel carrying the electrical and the state signal as combined from the audio interface to the control panel.

In accordance with an aspect of the present invention, there is provided a method of operating an alarm system comprising a control panel and an audio interface. The method comprises sensing an audio signal at the audio interface; sensing a state at the audio interface panel, and generating an inaudible electric state signal in response thereto; multiplexing the audio signal and the state signal to form a combined signal; and providing the combined signal to the control panel, for sensing the state at the control panel.

In accordance with an aspect of the present invention, there is provided an audio interface comprising: a microphone; a state sensor for sensing a state at the audio interface; a signal generator for generating an analog state signal indicative of the state; a combiner for forming a combined signal from an electrical signal corresponding to audio sensed at the microphone, and the state signal so that the state signal does not interfere with reproduction of audio from the electrical signal.

Conveniently, the state signal and audio signal may be carried on a single conductor, thereby reducing the number of physical interconnections between the control panel and audio interface.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
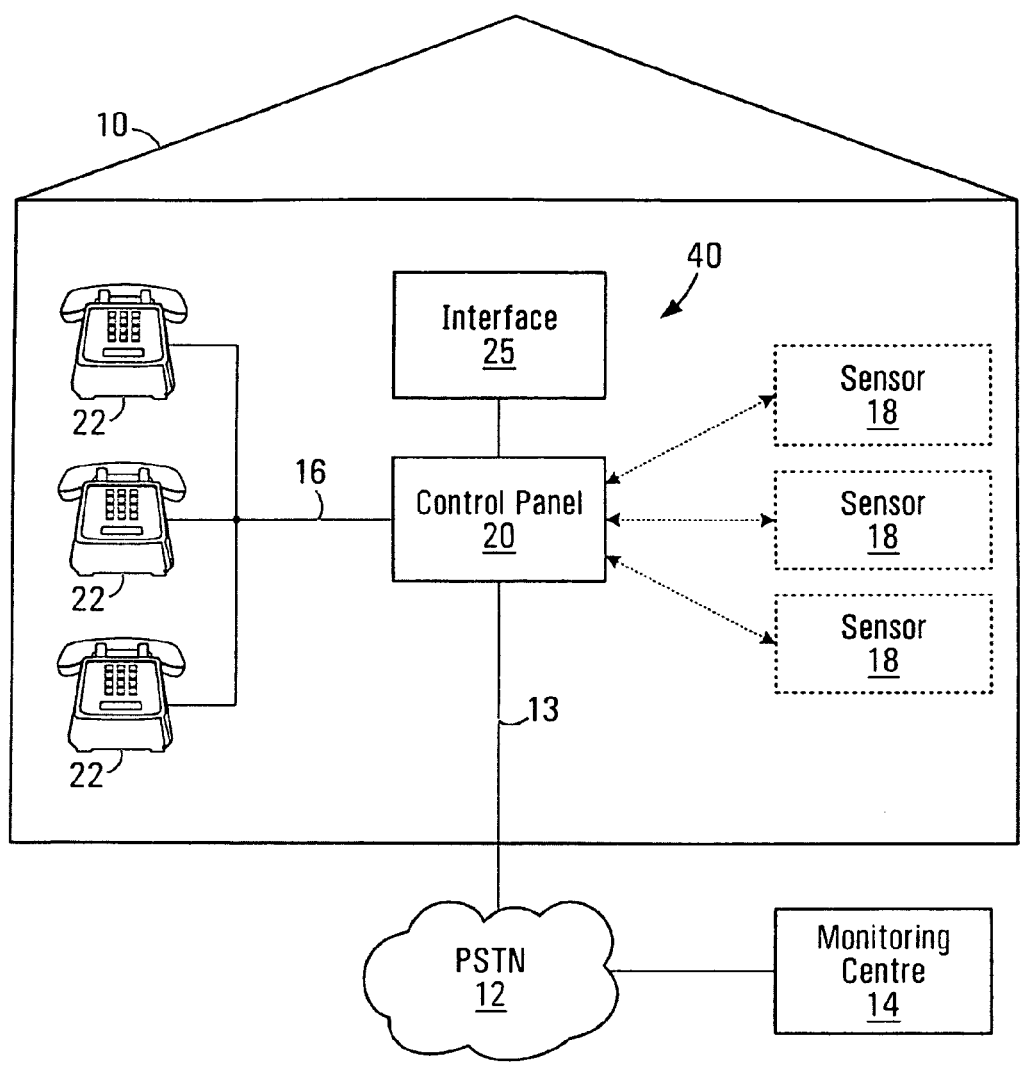
FIG. 1 is a block diagram of a premises monitored by an alarm system and associated monitoring center, exemplary of an embodiment of the present invention.

FIG. 1 illustrates premises 10, monitored by an alarm system 40 exemplary of an embodiment of the present invention. As illustrated, alarm system 40 includes a central control panel 20, in communication with a plurality of sensors 18. Sensors 18 may be entry sensors, motion sensors, flood sensors, smoke sensors, gas sensors or any other sensors being monitored as appreciated by those of ordinary skill. Sensors 18 may be in communication with control panel 20, wirelessly or by dedicated wires, by the electrical wiring of premises 10 or otherwise.

Alarm system 40 further includes an audio interface 25. Audio interface 25 may take the form of an audio station remote from panel 20, and may include a microphone and may optionally further include a camera, keypad, display, speaker, electronic ringer or the like.

Control panel 20 is interconnected with a communications network to a monitoring center 14. In the depicted embodiment, control panel 20 is interconnected by a subscriber line 13 to the public switch telephone network "PSTN" 12. Subscriber line 13 terminates in a central office (not shown) of PSTN 12. A monitoring center 14 is also interconnected with PSTN 12. Of course panel 20 could be interconnected with monitoring center 14 by way of another communications network, like a cellular telephone network, packet switched data network (e.g. the internet), or the like.

Monitoring center 14 is depicted as a single monitoring station. However, as is appreciated by those of ordinary skill, monitoring center 14 could be multiple monitoring stations, each in different physical locations. Monitoring center 14 is associated with one or more PSTN telephone numbers that would be used by telephone control panel 40 to contact monitoring center 14.

As will become apparent, audio interface 25 allows two way audio communication between alarm system 10 and monitoring center 14.

Sensors 18 and control panel 20 interact in a conventional manner. As particular sensor 18 is tripped, signifying a sensed condition, the sensor provides a signal to a sensor interface 26 of control panel 20. Control panel 20 initiates a communication to monitoring center 14. For example, control panel 20 may place a telephone call to a pre-programmed telephone number to contact monitoring center 14, typically by way of PSTN 12.

Figure 2:
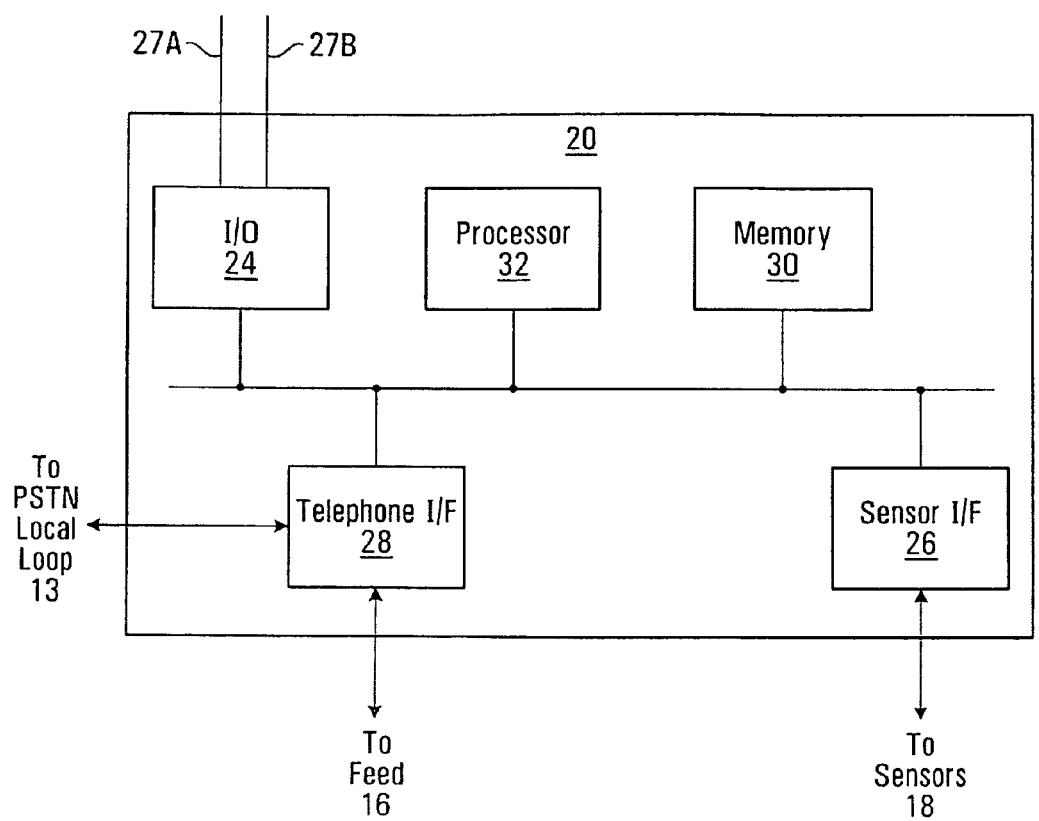
FIG. 2 is a block diagram of a control panel of the alarm system of FIG. 1.

Control panel 20 is more particularly illustrated in FIG. 2. As illustrated, control panel 20 includes a central processor 32 in communication with memory 30. Input/output interface 24, sensor interface 26, and network interface 28. In the depicted embodiment, network interface 28 is interconnected through PSTN subscriber line 13.

Input/output interface 24 may communicate with audio interface 25 (FIG. 1), and may bridge audio signals from and to audio station over network interface 28. In the depicted embodiment, audio interface 25 allows two-way full-duplex audio communication between control panel 20 and audio interface 25. As such, audio interface 25 is interconnected to control panel 20 by at least two conductors 27a, 27b (typically in the form of wires). The two conductors 27a, 27b are used to carry audio signals from and to audio interface 25 to control panel 20. As will become apparent, the audio signals may be bridged to monitoring center 14 so that sound at premises 10 may be monitored during alarm condition or otherwise at monitoring center 14. Likewise center 14 may originate a signal to be heard at audio interface 25.

Figure 3:
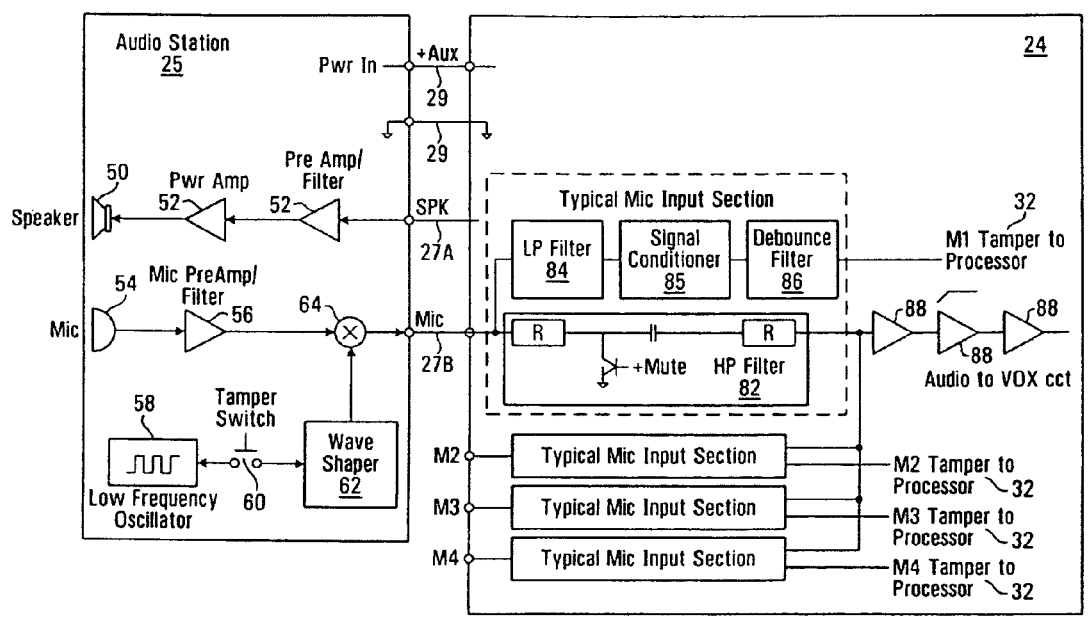
FIG. 3 is a schematic block diagram of a portion of an audio interface and control panel of the alarm system of FIG. 1.

A further block diagram of portion of audio interface 25 and input output interface 24 is depicted in FIG. 3. As illustrated, audio interface 25 includes a speaker 50, one or more amplifiers 52, a microphone 54, a microphone preamplifier 56, a signal generator 58, a state sensor 60, an optional signal conditioner 62 and a mixer/multiplexer 64.

Signal generator 58 generates an analog signal. Signal generator 58 may be a low frequency oscillator, which may for example generate a square wave or other wave form. Signal conditioner 62 may further condition the signal generated by signal generator 58. For example, if signal generator 58 generates a square wave, conditioner 62 may be a filter to generate a sine wave, or a saw tooth wave.

Mixer/multiplexer 64 may be an analog multiplexer or mixer that be capable of mixing two analog input signals. Mixer/multiplexer 64 may be a summer formed of passive components, or a sampling amplifier, or may take the form of a signal modulator or the like, or may be any other suitable signal combiner.

Microphone 54 may sense a signal in the audible range at audio interface 25. For example, microphone 54 may sense audio signals in the frequency range of 200-2000 Hz. Of course, a broader frequency range signals could be sensed by microphone 54. The audio signal may be amplified by microphone pre-amplifier 56.

Conductors 27a, 27b act as speaker and microphone wires to panel 20, respectively.

At panel 20, microphone conductor 27b feeds a filter 84 of input/output interface 24. Filter 84 is a low pass filter, and acts as a detector that detects a low frequency signal on conductor 27b. Filter 84 provides an output to a signal conditioner 85 in communication with a debounce filter 86 to provide digital signal output to processor 32 (FIG. 2).

Debounce filter 86 filters noise and transients that may interfere with a few cycles of the state signal, so that a digital tamper indication is not presented to the processor 30 prematurely. Electrostatic discharge at the audio station or a surge pulse induced into the conductor 27b are examples of noise signals that may be filtered by debounce filter 86.

Microphone conductor 27b similarly feeds one or more audio amplifiers 88 and buffers that, in turn, amplify any audible signal on conductor 27b to provide an audio signal that may be passed to network interface 28.

Likewise an audio signal from network interface 28 may be passed to conductor 27a for provision to audio interface 25.

Power may be provided to audio interface 25 by power supply conductors 29. These may originate at panel 20, or elsewhere, such as at a battery, AC adapter or the like. Conveniently, one of conductors 29 may provide a common ground between panel 20 and audio interface 25.

Figure 4:
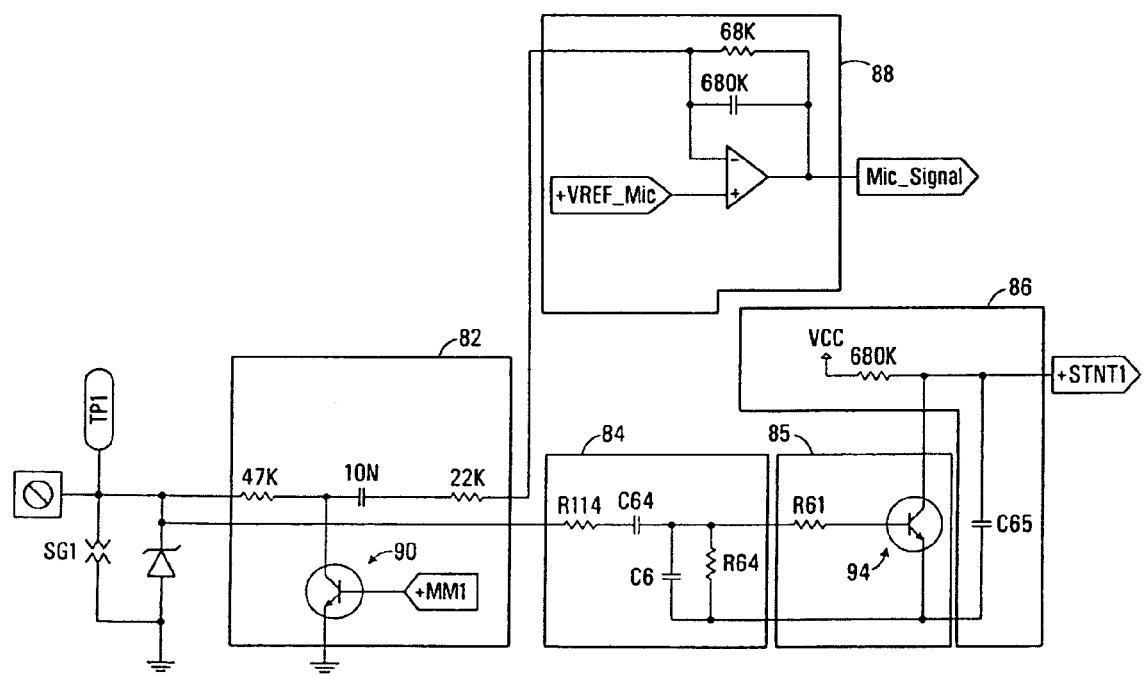
FIG. 4 is a schematic diagram of a portion of the control panel of the alarm system of FIG. 1.

At panel 20, as illustrated in FIG. 4, filter 82 forms a hi-pass filter with a 3 dB point near 250 Hz to allow the audio signal from microphone 54 to be passed to the audio section of panel 20 and blocks the subsonic signal. Transistor 90 is used to shut down the microphone input when required. The subsonic and audio signals are presented to the low-pass filter 84 which has a 3 dB roll-off at near 30 Hz. This allows the subsonic signal to be passed to signal conditioner 85 (formed of transistor 84) then debounce filter 86, while attenuating the audio signals.

In operation, signal generator 58 generates an inaudible signal, indicative of a sensed state at audio interface 25. In the depicted embodiment, the oscillator generates a low frequency electrical signal (which would produce a subsonic or near subsonic audio signal), for example having a frequency of less than 50 Hz (e.g. 25 or 20 Hz or less). As noted, this signal may be conditioned by signal conditioner 62, and provided to modulator/mixer 64. This low frequency state signal is carried by microphone conductor 27b. As required, the low frequency signal may be amplified in order to provide a desired signal strength at panel 20.

The sensed state may be an indication of whether or not audio interface is powered, whether it has been tampered with, or any other sensed condition, sensed at audio interface 25.

Audio interface 25 may be activated by user interaction at audio interface 25 (e.g. by way of button press, or the like), or by panel 20 in the presence of a sensed condition (e.g. a tripped entry sensor, fire, or the like).

In any event, once audio interface 25 is activated, an audio signal detected by microphone 54 may also be provided to multiplexer/mixer 64. Multiplexer/mixer 64 combines an electrical signal corresponding to audio sensed at the microphone from microphone 54 and the state signal from signal generator 58 to form a combined signal. As will become apparent, the state signal does not interfere with reproduction of audio from the electrical signal once extracted from the combined signal.

Thus, microphone conductor 27b carries the combined signal including both the audio signal and the state signal generated by signal generator 58.

Input/output interface 24 demultiplexes the audio and state signals on conductor 27b. Specifically hi-pass filter 82, low-pass filter 84 and signal conditioner 85 act as the de-multiplexer for the complex signal of different frequencies. Low-pass filter 84 allows any subsonic signal on conductor 27b to pass and feed signal conditioner 85 to create a digital signal that signals the presence or absence of the state signal on conductor 27b. This digital signal is applied to debounce filter 86 which filters transients, and thereby delays the application of a sudden change in the digital signal to the processor due, for example, to missing subsonic pulses on conductor 27b caused by electrostatic discharge at audio station 25 or the like.

Of course, if the state signal and audio signal were otherwise multiplexed (e.g. frequency modulated, phase modulated, or the like), input/output interface 24 could be perform complimentary demultiplexing to detect the state signal.

Now, state sensor 60, in the form of a switch is interconnected with low signal generator 58. In the presence of a tamper condition, the switch forming state sensor 60, is opened and the state signal is no longer generated by signal generator 58 or provided to microphone conductor 27b. Tamper switch forming state sensor 60 may, for example, be physically interconnected with the panel 20. The tamper switch may, for example, be a leaf switch, or contact switch used to sense the integrity of a housing, housing audio interface 25. The tamper switch may alternatively be a leaf switch or similar switch used to sense that audio panel 25 remains mounted. Alternatively, a mercury switch or other tamper sensor could be used as state sensor 60. As will be appreciated, although only a single tamper switch is depicted, multiple tamper switches or sensors could form part of audio panel 25 to form state sensor 60. The multiple switches could be connected in series or to multiple inputs of signal generator 58. A person of ordinary skill will readily appreciate multiple possible tamper detection arrangements that may be used as tamper switch 60, to detect unauthorized access, manipulation, disconnection or other tampering with audio interface 25. Alternatively, the tamper switch could be replaced with some other state sensor at audio interface 25. For example, a photo detector, moisture sensor, or the like could be used in place of a switch.

At panel 20, the absence of the state signal (e.g. the low frequency subsonic signal) may indicate a sensed state—such as a tamper condition, which may in turn, be signaled by control panel 20 by way of PSTN 12 to monitoring center 14. Additionally, a local alarm at premises 10 could be signalled. For example a siren may sound, or another audible or visual indicator could be signalled by panel 20.

Conveniently, disconnecting power from audio interface 25 may likewise cause signal generator 58 to cease providing the low frequency tamper signal, indicating a tamper with audio panel 25.

At the same time, audio signals from monitoring center 14 may be passed to audio interface 25 by network interface 28 over conductor 27a, allowing full duplex communication with monitoring center 14. Alternatively, half duplex communication could be permitted over a single conductor.

As will now be appreciated, by multiplexing both an audio signal and a low frequency (sub-audio) tamper, it may be possible to carry both audio and state signals using only one signal conductor (e.g. microphone conductor 27b). Conveniently, the state signal may result in an inaudible acoustic signal at panel 20 (and hence monitoring center 14), and need not interfere with audio monitoring at audio interface 25. Both audio and state signals are analog signals.

As will further be appreciated, although only a single audio interface 25 has been depicted, panel 20 may communicate with multiple such audio interfaces like audio interface 25, at different locations in premises 10, as suggested by FIG. 2.

In an alternate embodiment, a high frequency electrical signal (producing a supersonic acoustic signal—e.g. a signal in a frequency range higher than about 15,000 Hz) could be used as a state signal. Of course, suitable filters could be used at audio interface 25 to sense the presence or absence of a supersonic state signal.

In a further alternate embodiment, the state signal could used to modulate the bias of microphone 54. For example, the output of microphone 54 could be biased at a specific voltage level. The AC audio signal from the microphone would be AC coupled on the bias voltage and the tamper switch 60 would control the bias level. The bias level could be detected at panel 20 and if the bias level were inside a specific voltage window, no tamper condition could be sensed. Likewise if the bias level were outside the voltage window, a tamper condition/state could be detected. The bias level could be measured by an analog to digital converter at interface 24, and the voltage window limits could be assessed by processor 30 under software control.

Likewise, the state signal could be a frequency or phase modulated signal modulated onto the audio signal. The frequency could be detected using a frequency discriminator to determine the presence or absence of the tamper at the audio station. A phase modulated signal could likewise be detected using a phase detector.

Of course, the above-described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. An alarm system comprising:
    an audio interface comprising:
        a microphone for generating an electrical signal of audio sensed at said audio interface;
        a state sensor for sensing tampering at said audio interface;
        a signal generator for generating an analog state signal indicative of said tampering;
        a combiner for forming a combined signal from an electrical signal allowing audio sensed at said microphone to be reproduced, and said state signal so that said state signal does not interfere with reproduction of audio from said electrical signal;
    a control panel for monitoring sensed conditions at said audio interface and reproducing audio sensed at said audio interface at said control panel;
    a conductor interconnecting said audio interface to said control panel carrying said electrical and said state signal as combined from said audio interface to said control panel.

2. The alarm system of claim 1, wherein said state sensor comprises a tamper switch for sensing tampering with said audio interface.

3. The alarm system of claim 1, wherein said signal generator comprises a low frequency oscillator producing a frequency below the frequency of audible sound.

4. The alarm system of claim 3, wherein said low frequency oscillator generates a signal having a frequency less than 50 Hz.

5. The alarm system of claim 3, wherein said low frequency oscillator generates a signal having a frequency less than 25 Hz.

6. The alarm system of claim 1, wherein said combiner comprises an analog multiplexer.

7. The alarm system of claim 1, further comprising two power conductors, for providing electrical power to said audio interface.

8. The alarm system of claim 7, wherein said two power conductors interconnect said control panel to said audio interface.

9. The alarm system of claim 1, wherein absence of said state signal on said conductor indicates an alarm condition to said control panel.

10. The alarm system of claim 1, wherein said signal generator comprises a oscillator producing a frequency above the frequency of audible sound.

11. The alarm system of claim 1, wherein said combiner comprises a summing amplifier.

12. A method of operating an alarm system comprising a control panel and an audio interface:
   sensing an audio signal at an audio transducer at said audio interface;
   sensing a state at said audio interface panel, and generating an analog electric state signal in response thereto;
   mixing at an analog mixer said audio signal and said state signal to form a combined signal from which audio sensed at said audio transducer may be reproduced, and said state signal does not interfere with reproduction of audio from said combined signal; and
   providing said combined signal to said control panel, for sensing said state at said control panel and for reproducing said audio signal at said panel.

13. The method of claim 12, wherein said sensing a state comprises sensing tampering with said audio interface.

14. The method of claim 12, wherein said mixing comprises summing said audio signal and said state signal on a single conductor.

15. The method of claim 12, wherein said state signal has a frequency of less than 50 Hz.

16. An audio interface comprising:
   a microphone for generating an electrical signal of audio sensed at said audio interface;
   a state sensor for sensing a state at said audio interface;
   a signal generator for generating an analog state signal indicative of said state;
   a combiner for forming a combined signal from an electrical signal corresponding to audio sensed at said microphone, and said state signal so that said audio may be reproduced from said combined signal at a control panel and said state signal does not interfere with reproduction of audio from said electrical signal.

* * * * *